United States Patent [19]

Hosoi

[11] Patent Number: 5,183,020

[45] Date of Patent: Feb. 2, 1993

[54] IGNITION TIMING CONTROL APPARATUS FOR ENGINE

[75] Inventor: Keiji Hosoi, Shizuoka, Japan

[73] Assignee: Suzuki Motor Corporation, Shizuoka, Japan

[21] Appl. No.: 775,819

[22] Filed: Oct. 11, 1991

[30] Foreign Application Priority Data

Oct. 31, 1990 [JP] Japan ................... 2-294463

[51] Int. Cl.$^5$ ................... F02P 5/145; F02M 25/07
[52] U.S. Cl. ................... 123/406; 123/571
[58] Field of Search ............... 123/406, 415, 416, 417, 123/571

[56] References Cited

U.S. PATENT DOCUMENTS

| | | | |
|---|---|---|---|
| 4,314,540 | 2/1982 | Ikeura | 123/571 |
| 4,315,492 | 2/1982 | Gardner | 123/406 X |
| 4,598,684 | 7/1986 | Kato et al. | 123/571 X |
| 4,947,820 | 8/1990 | Kushi | 123/478 X |

FOREIGN PATENT DOCUMENTS 57-179370 11/1982 Japan.
221467 12/1984 Japan ................... 123/571
61-66667 5/1986 Japan.

Primary Examiner—Tony M. Argenbright
Attorney, Agent, or Firm—Flynn, Thiel, Boutell & Tanis

[57] ABSTRACT

In an engine including an exhaust gas recirculation mechanism for recirculating exhaust gas to the engine intake system, and an ignition timing control apparatus for the engine, a duty-controlled EGR rate regulating solenoid valve is disposed in an EGR passage which intercommunicates the exhaust and intake passages of the engine. An arrangement is provided for controlling the activation of the ignition timing control apparatus in order to adjust the ignition timing in accordance with a duty rate applied to the EGR rate regulating solenoid valve.

2 Claims, 4 Drawing Sheets

EGR DUTY = 0 (%)

EGR DUTY = 100 (%)

IGNITION TIMING CONTROL APPARATUS FOR ENGINE

FIELD OF THE INVENTION

This invention relates to an ignition timing control apparatus for an engine, and particularly to an ignition timing control apparatus for an engine capable of enhancing its drivability by changing an EGR rate in a non-stage manner and adjusting the ignition timing in accordance with the EGR rate.

BACKGROUND OF THE INVENTION

An engine usually includes an exhaust gas recirculation (EGR) mechanism for reducing the harmful components contained in the exhaust gas by recirculating the exhaust gas into the gas intake system.

That is, as is shown in FIG. 6, in an engine 202, an intake pipe 206 forming an intake passage 204 and an exhaust pipe 210 forming an exhaust passage 208 are disposed in a connected relation. An EGR valve 212 is attached to the intake pipe 206. Disposed between the EGR valve 212 and the exhaust pipe 210 is an EGR pipe 216 forming an EGR passage 214.

In an intermediate portion of the EGR pipe 216, an EGR switch-over valve (VSV) 218 is disposed. This EGR switch-over valve 218 is operation-controlled by a control means (ECU) 220.

Input into the control means 220 are data of the driving state of the engine 202 such as cooling water temperature, intake pipe absolute pressure PM, intake-air temperature, throttle opening degree, number of engine revolution (engine rotational speed), etc.

The control means 220 is connected to a crank angle sensor 222 mounted on the engine 202 and adapted to detect the crank angle, and is also connected with an ignition mechanism (ignitor) 224 for the engine 202. This ignition mechanism 224 is of an electronic spark advance (ESA) type.

In FIG. 6, the controlling of the EGR rate to the intake system is performed by an on/off operation of the EGR valve 212. This being the case, the ignition timing at this time is either held constant whether the recirculation of exhaust gas is effected or not, or adjusted in two stages depending on whether the recirculation of exhaust gas is effected or not.

On the other hand, in an ignition timing control operation of an ignition mechanism of a distributor type instead of the ignition mechanism of an electronic spark advance type, the ignition timing is held constant whether the recirculation of exhaust gas is effected or not.

One such ignition timing control apparatus is disclosed, for example, in Japanese Patent Early Laid-open Publication No. Sho 57-179370 and Japanese Utility Model Early Laid-open Publication No. Sho 61-66667. One, which is described in Japanese Patent Early Laid-open Publication No. Sho 57-179370, is designed such that if, at the time a non-operating state of the EGR valve is detected, the engine speed and the value of a signal representing the amount of air intaken are within the ranges of the amount of intaken air and the engine speed on level ground, then the ignition timing is optimally corrected in order to prevent the occurrence of knocking of the engine also on a high land.

Another apparatus, which is described in Japanese Utility Model Early Laid-open Publication No. Sho 61-66667, is designed such that the ignition timing is corrected in accordance with EGR based on the change in the rate of EGR.

There is conventionally an inconvenience in that, since the control means does not have a single kind of ignition timing map, the ignition timing at the time that recirculation of exhaust gas is not effected is excessively spark advanced, thus exerting adverse affects on drivability, emission, etc.

Also, because of the above-mentioned reason, the exhaust gas recirculation mechanism cannot be turned on/off positively depending on driving conditions of the engine and, therefore, improvement was demanded.

Further, even in case the control means is provided with two kinds of ignition timing maps for performing an on/off operation for the exhaust gas recirculation mechanism, there is an inconvenience in that an attempt is made to control the rate of EGR, and the ignition timing is excessively spark advanced or excessively spark halted because the required ignition timing is uselessly changed due to difference in the rate of EGR.

Therefore, an object of the present invention is to provide an ignition timing control apparatus for an engine, in which a duty-controlled EGR rate regulating solenoid valve is disposed midway along an EGR passage intercommunicating an exhaust passage and an intake passage, and by adjusting the ignition timing in accordance with a duty rate which controls the EGR rate regulating solenoid valve, the EGR rate is changed in a non-stage manner and the ignition timing is optimally adjusted in accordance with this EGR rate, thereby enhancing the drivability and obtaining the most appropriate exhaust emission.

In an attempt to achieve the above object, in an engine including an exhaust gas recirculation mechanism for recirculating a part of the exhaust air into the gas intake system, the present invention is characterized in a duty-controlled EGR rate regulating solenoid valve is disposed midway along an EGR passage intercommunicating the exhaust passage and the intake passage, and means for controlling the activation of the engine ignition mechanism is provided in order to adjust the ignition timing in accordance with a duty rate which is applied to said EGR rate regulating solenoid valve.

According to the constitution of the present invention, since the control means actuates the ignition mechanism in accordance with the duty rate applied to the EGR rate regulating solenoid valve to adjust the ignition timing, the ignition timing can be optimally set when the EGR rate is changed in a non-stage manner and by this, the EGR rate can be positively controlled to enhance the drivability and to obtain the most appropriate exhaust emission.

BRIEF DESCRIPTION OF THE DRAWINGS

One embodiment of the present invention will be described in detail with reference to the drawings, in which.

DETAILED DESCRIPTION

Figure 1:
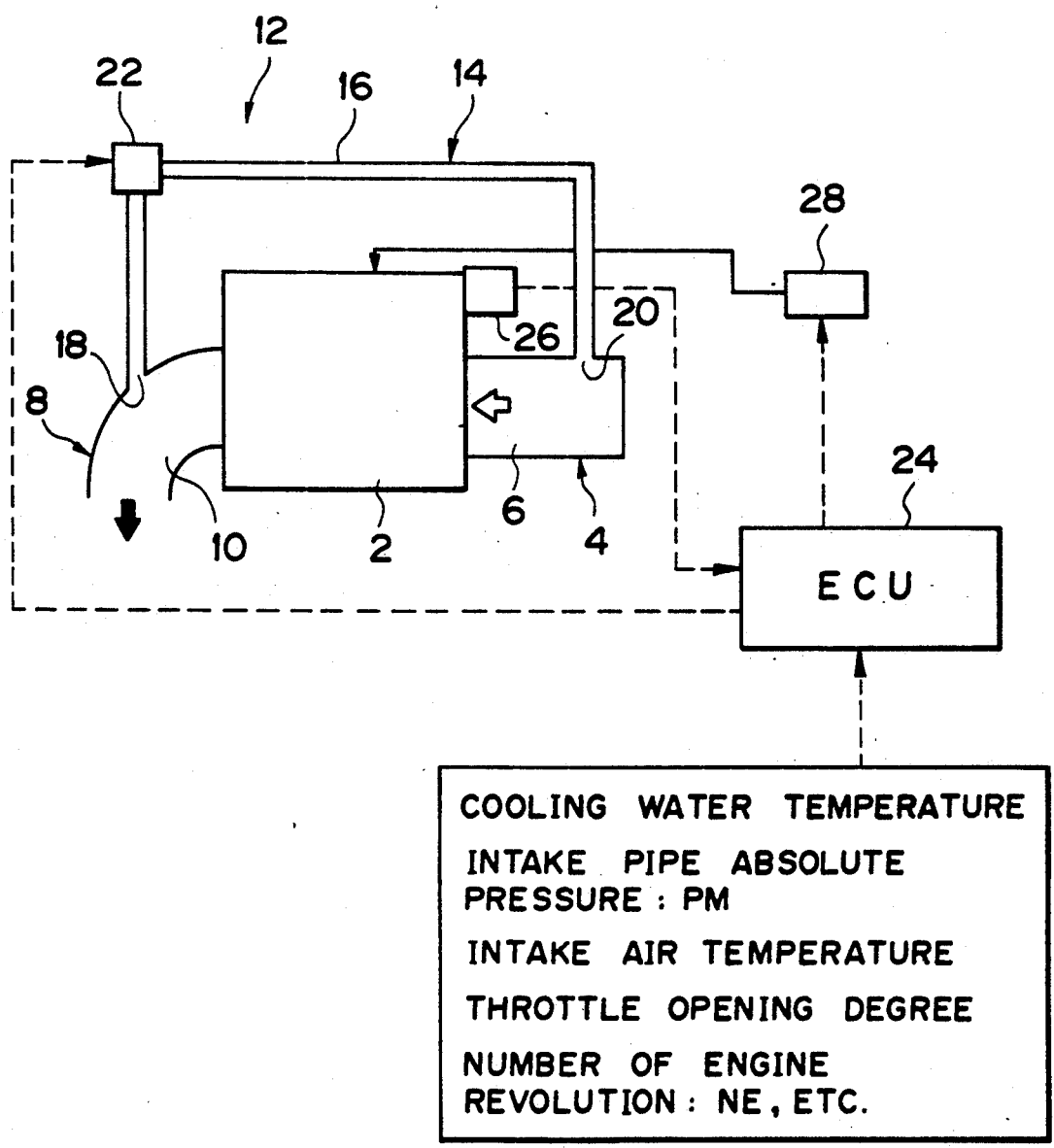
FIG. 1 is a block diagram of an ignition timing control system apparatus for an engine.

FIGS. 1 through 5 show one embodiment of the present invention. In FIG. 1, the numeral 2 denotes an engine, 4 an intake pipe, 6 an intake passage, 8 an exhaust pipe, and 10 an exhaust passage. The intake pipe 4 and the exhaust pipe 8 are interconnected by an EGR pipe 14 forming an exhaust gas recirculation mechanism 12.

This EGR pipe 14 forms an EGR passage 16 for intercommunicating the intake passage 6 and the exhaust passage 10. That is, an EGR inlet port 18 as the start of the EGR passage 16 opens into the exhaust passage 10 and an EGR circulation portion 20 as a terminal of the EGR passage 16 opens into the intake passage 6. Midway along this EGR passage 16, a duty-controlled EGR rate regulating solenoid valve 22 is disposed in order to regulate the rate of EGR by opening and closing the EGR passage 16. This EGR rate regulating solenoid valve 22 is duty-controlled by a control means (ECU) 24. That is, the valve 22 is activated by ECU 24 between a state of 0% of EGR duty (totally closed state) and a state of 100% of EGR duty (totally opened state). By this, the EGR rate effected by the EGR passage 16 can be controlled in a non-stage manner as defined by the continuum of duty rates between 0% and 100%.

Input into this control means 24 are data representing cooling water temperature, intake pipe absolute pressure PM, intake air temperature, throttle opening degree, the number of engine revolution (i.e. engine rotational speed) NE, and a crank angle of the engine from a crank angle sensor 26 attached to the engine 2.

Figure 4:
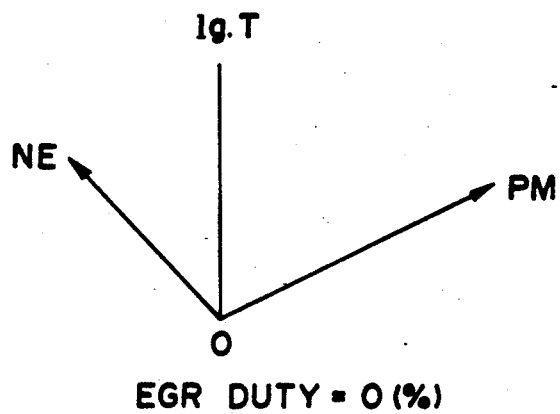
FIG. 4 is an explanatory view of an ignition timing map where the EGR duty rate is 0%.
Figure 5:
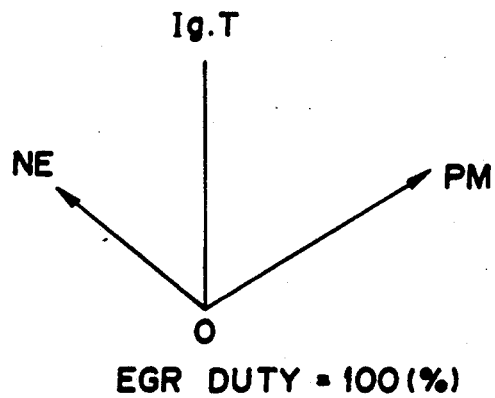
FIG. 5 is an explanatory view of an ignition timing map where the EGR duty rate is 100%.
Figure 6:
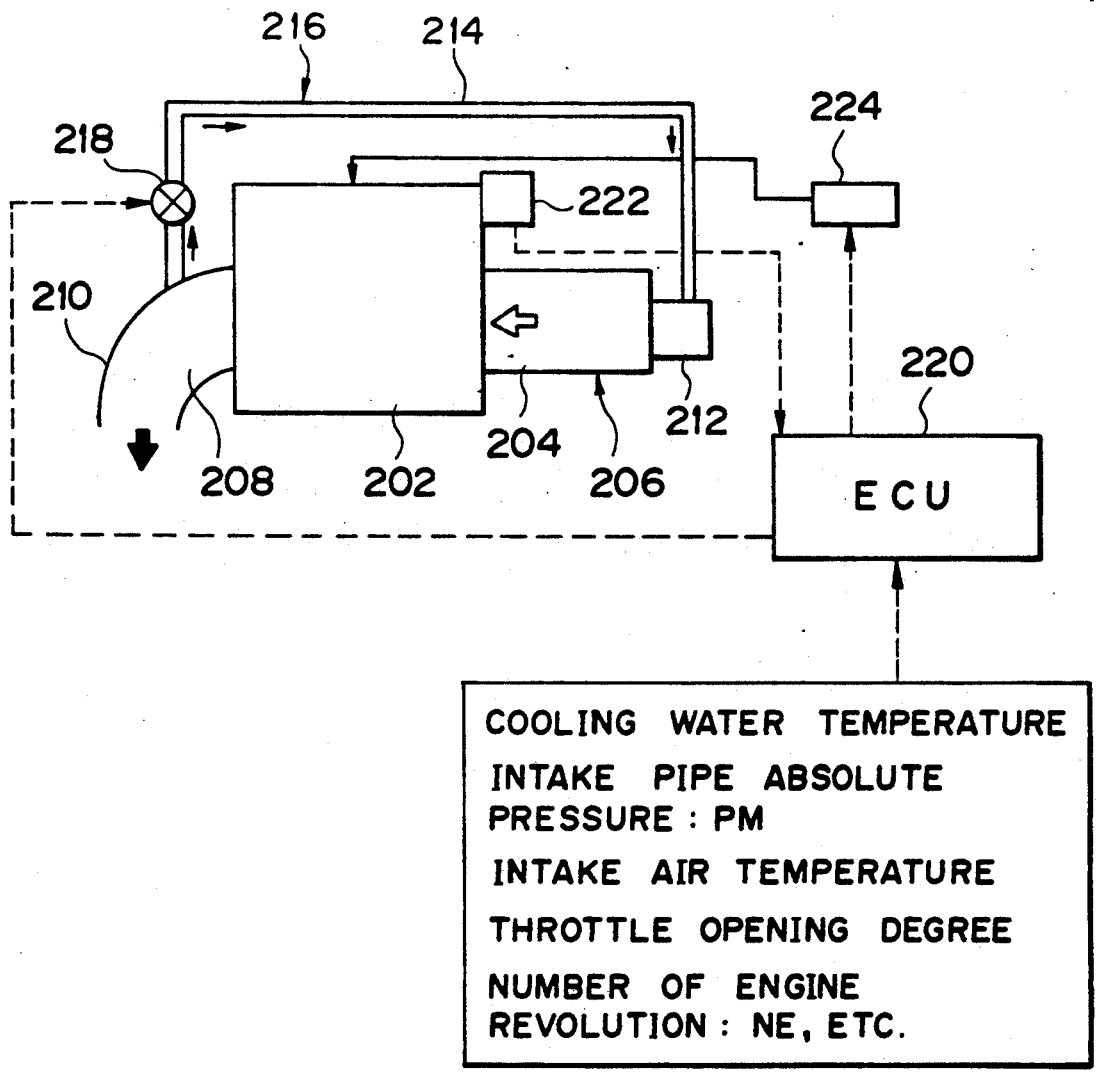
FIG. 6 is a block diagram of a conventional ignition timing control system apparatus.

Further, this control means 24 is operated to control the activation of an ignition mechanism 28 of the engine 2 in order to adjust the ignition timing in accordance with the duty rate applied to the EGR rate regulating solenoid valve 22. The control means 24 has an ignition timing map (see FIG. 4) for use at the time the EGR duty is 0% (EGR is in the totally closed state) and an ignition timing map (see FIG. 5) for use at the time the EGR duty is 100% (EGR is in the totally open state). Those ignition timing maps shown in FIGS. 4 and 5 are decided by, for example, the engine rotational speed NE and the intake pipe absolute pressure PM. Accordingly, when the EGR duty is 100%, the FIG. 5 map indicates that the ignition timing is to be spark advanced. For example, the ignition timing is 20 BTDC when the EGR duty is 0% and the ignition timing is 40 BTDC when the EGR duty is 100%, at a certain lattice point defined by the values of NE and PM (see FIGS. 4 and 5) That is, for given values of NE and PM, FIGS. 4 and 5 yield 20° BTDC and 40 ° BTDC, respectively, as functions of NE and PM. Thus, for example, 20° BTDC=f(NE, PM).

Figure 3:
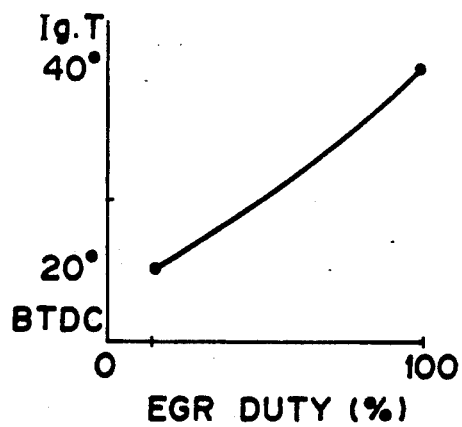
FIG. 3 is an explanatory view of an ignition timing map where the EGR duty rate is between 0% and 100%.

And in case a vehicle runs at this lattice point, the ignition timing control at the time the EGR duty is changed between 0% and 100% is decided with reference to the ignition timing map of FIG. 3. That is, for given values of NE and PM, when the EGR duty is something other than 0% and 100%, interpolation is effected with reference to FIG. 3. Accordingly, in case the EGR rate is changed in a non-stage manner, the best ignition timing can be obtained based on the ignition timing decided by the ignition timing maps of FIGS. 3, 4 and 5.

It will be evident from the foregoing and following discussions that ECU 24 can be implemented using a conventional microprocessor circuit.

Figure 2:
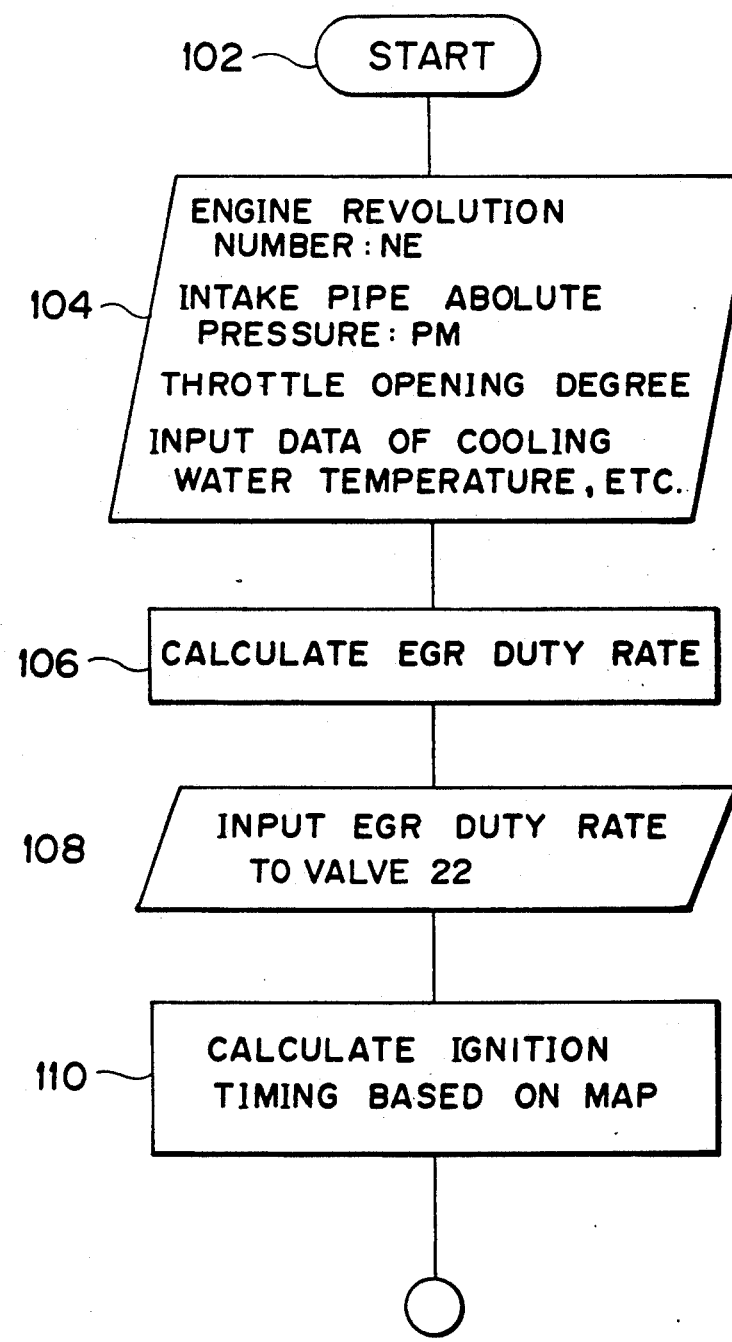
FIG. 2 is a flowchart for explaining the operation of the FIG. 1 system.

Next, operation of this embodiment will be described with reference to the flowchart of FIG. 2.

In the control means 24, when a program is started (step 102), first, the data representing the engine rotational speed NE, intake pipe absolute pressure PM, throttle opening degree, cooling water temperature, etc. are input (step 104), and then a duty rate for the EGR rate regulating solenoid valve 22 is calculated from this data (step 106).

Next, the control means 24 is operated to control the activation of the EGR rate regulating solenoid valve 22 in accordance with the calculated duty rate (step 108).

Further, the control means 24 is operated at 110 to control the activation of the ignition mechanism 28 and thereby implement the ignition timing decided based on the ignition timing maps of FIGS. 3 through 5 with reference to the EGR duty rate calculated at 106. That is, the control means 24 is operated to actuate the ignition mechanism 28 at the ignition timing decided by the ignition timing map shown in FIG. 4 when the EGR duty is 0%, the control means 24 is operated to actuate the ignition mechanism 28 at the ignition timing decided based on the ignition timing map shown in FIG. 5 when the EGR duty is 100%, and the control means 24 is operated to actuate the ignition timing mechanism 28 at the ignition timing decided based on the ignition timing map of FIG. 3 when the EGR duty is something other than 0% and 100% (step 110).

As a result, since the EGR rate regulating solenoid valve 22 is duty-controlled by the control means 24, the EGR rate can be changed in a non-stage manner and since the ignition timing is optimally adjusted in accordance with the duty rate applied to the EGR rate regulating solenoid valve 22, the drivability can be enhanced and there can be obtained the most appropriate exhaust emission. Further, since the ignition timing is changed in accordance with the EGR rate, the drivability can be enhanced by positively changing the EGR rate (or turning off the EGR).

Furthermore, since the ignition timing maps of FIGS. 4 and 5 are only, for example, two-dimensional maps of engine rotational speed (NE) X intake pipe absolute pressure (PM), and do not require a three-dimensional map of engine speed NE X intake pipe absolute pressure PM X EGR duty rate, the control means 24 can be simplified and the capacity of the control means 24 can be reduced.

As apparent from the foregoing detailed description, according to the present invention, since a duty-controlled EGR rate regulating solenoid valve is disposed midway along an EGR passage intercommunicating an exhaust passage and an intake passage, and means for controlling the activation of the engine ignition mechanism is provided in order to adjust the ignition timing in accordance with a duty rate applied to the EGR rate regulating solenoid valve, the EGR rate can be changed in a non-stage manner and the ignition timing can be optimally adjusted in accordance with the duty rate applied to the EGR rate regulating solenoid valve, thus enhancing drivability by positively controlling the EGR rate and obtaining the most appropriate exhaust emission.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In an engine including an intake passage, an exhaust passage, and an exhaust gas recirculation means for recirculating a selected amount of exhaust gas from said exhaust passage back to said intake passage, the improvement comprising:

means responsive to said exhaust gas recirculation means for setting an ignition timing of the engine to first and second ignition timing settings in response to recirculation of respective minimum and maximum amounts of exhaust gas; and means responsive to said exhaust gas recirculation means for setting the ignition timing to a third ignition timing setting in response to recirculation of a third amount of exhaust gas which is greater than said minimum amount but less than said maximum amount, including interpolation means for obtaining said third ignition timing setting by interpolating between said first and second ignition timing settings based on the relationship which said third amount of exhaust gas bears to said minimum and maximum amounts of exhaust gas.

2. The engine according to claim 1, wherein said means for setting said first and second ignition timing settings includes means for determining said first and second ignition timing settings as a function of engine rotational speed and intake pressure in said intake passage.

* * * * *